United States Patent
Wakai

(10) Patent No.: US 8,482,737 B2
(45) Date of Patent: *Jul. 9, 2013

(54) VARIABLE SPECTRAL ELEMENT

(75) Inventor: Hiroshi Wakai, Hamura (JP)

(73) Assignee: Olympus Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,425

(22) Filed: Sep. 14, 2012

(65) Prior Publication Data

US 2013/0016359 A1    Jan. 17, 2013

Related U.S. Application Data

(63) Continuation of application No. PCT/JP2011/055995, filed on Mar. 15, 2011.

(30) Foreign Application Priority Data

Mar. 30, 2010 (JP) ................................. 2010-078213

(51) Int. Cl.
  *G01B 9/02* (2006.01)
  *G01J 3/45* (2006.01)
  *G02B 27/00* (2006.01)

(52) U.S. Cl.
  USPC .......................................... 356/454; 359/578

(58) Field of Classification Search
  USPC ........................... 356/454, 519; 359/578, 579
  See application file for complete search history.

(56) References Cited

U.S. PATENT DOCUMENTS

| | | | | |
|---|---|---|---|---|
| 7,190,523 | B2 * | 3/2007 | Yoda | 359/579 |
| 8,081,314 | B2 * | 12/2011 | Kamihara | 356/454 |
| 8,319,169 | B2 * | 11/2012 | Funasaka | 250/216 |
| 2010/0027010 | A1 | 2/2010 | Matsumoto | |
| 2010/0103522 | A1 | 4/2010 | Matsumoto | |
| 2013/0010285 | A1 * | 1/2013 | Wakai | 356/72 |

FOREIGN PATENT DOCUMENTS

| | | |
|---|---|---|
| EP | 2 083 307 A1 | 7/2009 |
| EP | 2 120 082 A1 | 11/2009 |
| JP | 06-241899 | 9/1994 |
| JP | 2008-129149 | 6/2008 |
| JP | 2008-197362 | 8/2008 |
| JP | 2010-224011 | 10/2010 |
| WO | 2008/059892 A1 | 5/2008 |
| WO | 2008/099817 A1 | 8/2008 |
| WO | 2011/122323 A1 | 10/2011 |

* cited by examiner

*Primary Examiner* — Michael A Lyons
(74) *Attorney, Agent, or Firm* — Scully, Scott, Murphy & Presser, P.C.

(57) ABSTRACT

A variable spectroscopic element in which a placed position of first sensor and a placed position of the third sensor are symmetrical and a placed position of second sensor and a placed position of fourth sensor are symmetrical with respect to a line connecting the centers of mass of the surfaces of a pair of optical substrates opposite to each other respectively and first to fourth actuators are arranged includes a control unit which calculates a distance between the centers of mass, a first angle that is made between the moved optical substrate and the other optical substrate and a second angle that is made between the other optical substrate and the moved optical substrate, with signals from the first to fourth sensors, and drives the first to fourth actuators on the basis of the distance between the centers of mass, the first angle, and the second angle.

5 Claims, 6 Drawing Sheets

VARIABLE SPECTRAL ELEMENT

This application claims benefits of Japanese Application No. 2010-078213 filed in Japan on Mar. 30 2010, the contents of which are incorporated herein by reference.

BACKGROUND OF THE INVENTION

1. Field of the Invention

This invention relates to a variable spectroscopic element.

2. Description of Related Art

Variable spectroscopic elements each including an etalon device and a control unit have been known up to now as a variable spectroscopic element in which one of or both of a pair of optical substrates arranged opposite at a distance from each other are moved by an actuator like a piezoelectric device so that a distance between the surfaces of the optical substrates opposite to each other or a distance between the reflective films formed on the surfaces of the optical substrates opposite to each other (which is generically called "surface distance between the optical substrates" hereinafter) is changed to make it possible to vary optical characteristics of the variable spectroscopic element. (For example, refer to Japanese Patent TOKUKAI NO. 2008-129149.)

Also, it is known that such variable spectroscopic elements include a variable spectroscopic element in which: capacitive sensors for measuring a surface distance between the optical substrates are arranged on the surfaces of the optical substrates opposite to each other respectively in order to make the optical substrates have a desired surface distance; a present surface distance between the optical substrates is measured by the capacitive sensors with a predetermined sampling period; the measured surface distance between the optical substrates is compared with a desired surface distance between the optical substrates; and an actuator is made to operate on the basis of the result of the comparison between the measured surface distance and the desired surface distance so that the surface distance between the optical substrates is adjusted. (For example, refer to Japanese Patent TOKUKAI NO. Hei 6-241899.)

SUMMARY OF THE INVENTION

A variable spectroscopic element according to the present invention is characterized in that: the variable spectroscopic element includes a pair of optical substrates which are arranged opposite at a distance from each other, first, second, third, and fourth capacitive sensors each of which includes a pair of electrodes placed on the surfaces of the pair of the optical substrates opposite to each other respectively and each of which detects a distance between the surfaces of the pair of the optical substrates opposite to each other at the each placed position, and first, second, third, and fourth actuators which move at least one of the pair of the optical substrates relative to the other optical substrate to change a distance between the surfaces of the pair of the optical substrates opposite to each other; the first and third capacitive sensors are placed at positions at which the first and third capacitive sensors are symmetrical with respect to a line connecting the centers of mass of the surfaces of the pair of the optical substrates opposite to each other, respectively; the second and fourth capacitive sensors are placed at positions at which the second and fourth capacitive sensors are symmetrical with respect to the line connecting the centers of mass of the surfaces of the pair of the optical substrates opposite to each other, respectively; the first, second, third, and fourth actuators are placed on lines running from the centers of mass of the surfaces of the pair of the optical substrates opposite to each other to the centers of the first, second, third, and fourth capacitive sensors respectively, respectively; and the variable spectroscopic element includes a control unit, the control unit calculating a distance between the centers of mass of the surfaces of the pair of the optical substrates opposite to each other with signals from the first, second, third, and fourth capacitive sensors, the control unit calculating with signals from the first and third capacitive sensors a first angle that is made between the surface of the optical substrate perpendicular to the line connecting the centers of mass of the surfaces of the pair of the optical substrates and the surface of the moved optical substrate opposite to the surface of the optical substrate perpendicular to the line connecting the centers of mass of the surfaces of the pair of the optical substrates, the control unit calculating with signals from the second and fourth capacitive sensors a second angle that is made between the surface of the optical substrate perpendicular to the line connecting the centers of mass of the surfaces of the pair of the optical substrates and the surface of the moved optical substrate opposite to the surface of the optical substrate perpendicular to the line connecting the centers of mass of the surfaces of the pair of the optical substrates, the control unit driving the first and third actuators on the basis of the distance between the centers of mass and the first angle, and the control unit driving the second and fourth actuators on the basis of the distance between the centers of mass and the second angle.

Also, a variable spectroscopic element according to the present invention is characterized in that: the variable spectroscopic element includes a pair of optical substrates which are arranged opposite at a distance from each other, first, second, third, and fourth capacitive sensors each of which includes a pair of electrodes placed on the surfaces of the pair of the optical substrates opposite to each other respectively and each of which detects a distance between the surfaces of the pair of the optical substrates opposite to each other at the each placed position, and first, second, third, and fourth actuators which move at least one of the pair of the optical substrates relative to the other optical substrate to change a distance between the surfaces of the pair of the optical substrates opposite to each other; the first and third capacitive sensors are placed at positions at which the first and third capacitive sensors are symmetrical with respect to a line connecting the centers of mass of the surfaces of the pair of the optical substrates opposite to each other, respectively; the second and fourth capacitive sensors are placed at positions at which the second and fourth capacitive sensors are symmetrical with respect to the line connecting the centers of mass of the surfaces of the pair of the optical substrates opposite to each other, respectively; the first, second, third, and fourth capacitive sensors and the first, second, third, and fourth actuators are arranged on a circle at regular intervals one after the other when these capacitive sensors and these actuators are viewed from a direction along the line connecting the centers of mass of the surfaces of the pair of the optical substrates opposite to each other; and the variable spectroscopic element includes a control unit, the control unit calculating a distance between the centers of mass of the surfaces of the pair of the optical substrates opposite to each other with signals from the first, second, third, and fourth capacitive sensors, the control unit calculating a first angle that is made between the surface of the optical substrate perpendicular to the line connecting the centers of mass of the surfaces of the pair of the optical substrates and the surface of the moved optical substrate opposite to the surface of the optical substrate perpendicular to the line connecting the centers of mass of the surfaces of the pair of the optical substrates, with values of distances between the surfaces of the pair of the optical substrates opposite to each other at the positions at which the first and third actuators are placed respectively, these values of the distances between the surfaces of the optical substrates at the positions of the first and third actuators being found with signals from the first, second, third, and fourth capacitive sensors, the control unit calculating a second angle that is made between the surface of the optical substrate perpendicular to the line connecting the centers of mass of the surfaces of the pair of the optical substrates and the surface of the moved optical substrate opposite to the surface of the optical substrate perpendicular to the line connecting the centers of mass of the surfaces of the pair of the optical substrates, with values of distances between the surfaces of the pair of the optical substrates opposite to each other at the positions at which the second and fourth actuators are placed respectively, these values of the distances between the surfaces of the optical substrates at the positions of the second and fourth actuators being found with signals from the first, second, third, and fourth capacitive sensors, and the control unit driving the first, second, third, and fourth actuators on the basis of the distance between the centers of mass, the first angle, and the second angle.

These and other features and advantages of the present invention will become apparent from the following detailed description of the preferred embodiments when taken in conjunction with the accompanying drawings.

BRIEF DESCRIPTION OF THE DRAWINGS

FIG. 5 is a graph showing the response characteristic of the etalon device shown in FIG. 1.

DETAILED DESCRIPTION OF THE PREFERRED EMBODIMENTS

The embodiments of the present invention will be explained in detail below, using the drawings.

Embodiment 1

The variable spectroscopic element of the embodiment 1 according to the present invention is explained using FIGS. 1 to 5, and four examples of variations of the variable spectroscopic element of the embodiment 1 are explained using FIGS. 6 to 9.

Figure 1:
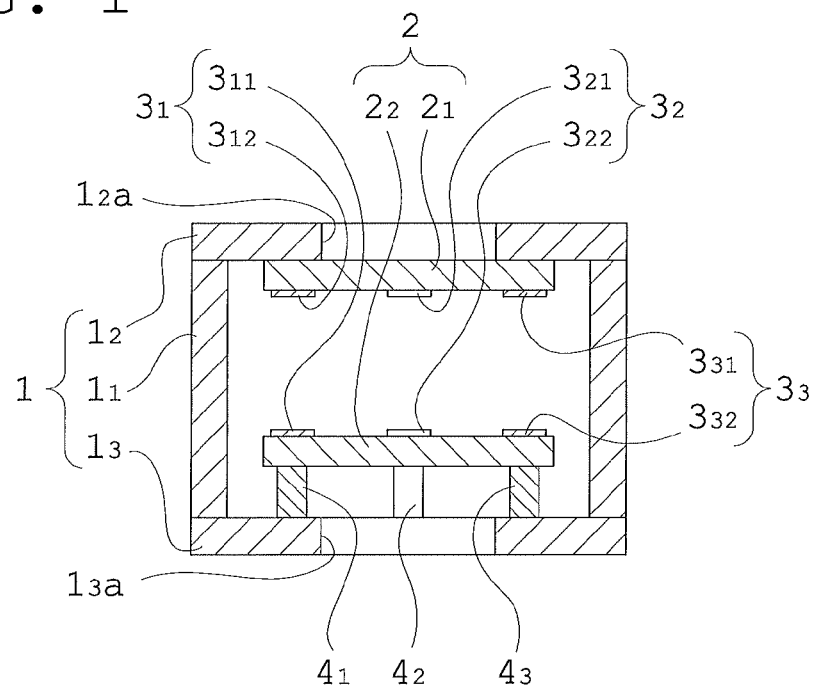
FIG. 1 is a cross sectional view showing an etalon device in a variable spectroscopic element according to the embodiment 1.
Figure 2:
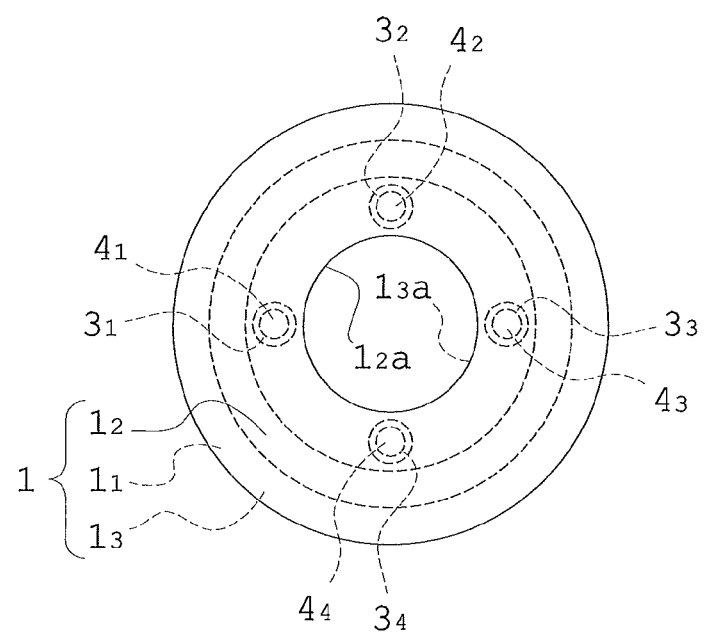
FIG. 2 is a plane view showing the etalon device shown in FIG. 1.
Figure 3:
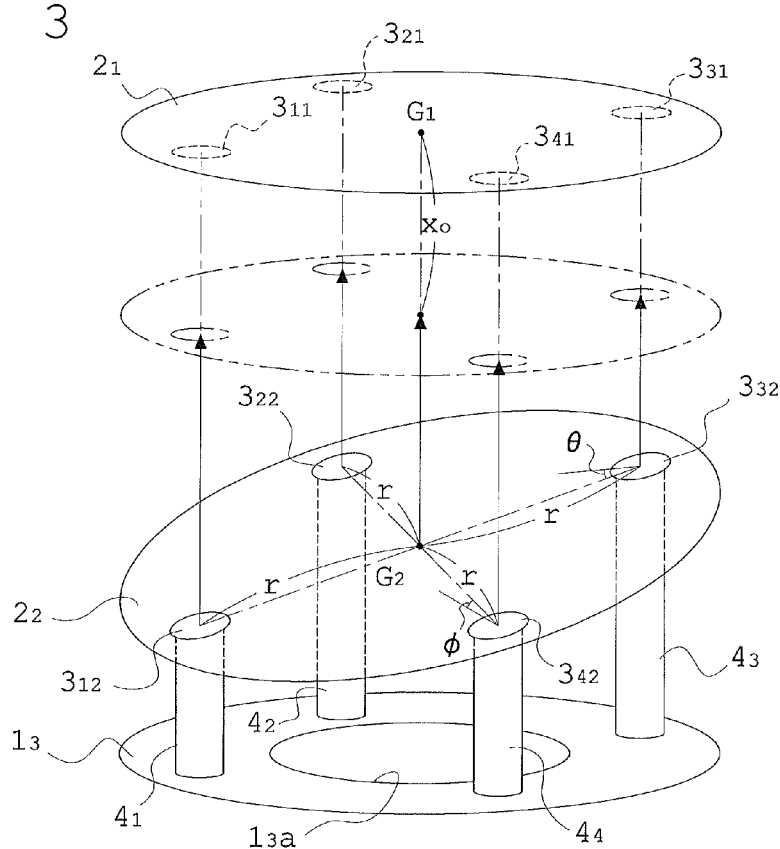
FIG. 3 is a schematic view showing operations of a pair of optical substrates and four piezoelectric devices in the etalon device shown in FIG. 1.
Figure 4:
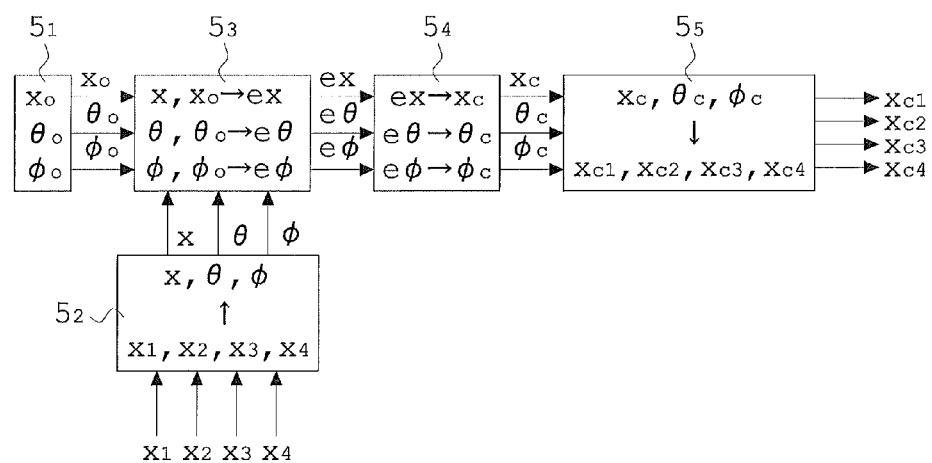
FIG. 4 is a block diagram showing an operation which is performed by a control unit of the variable spectroscopic element according to the embodiment 1.
Figure 5A:
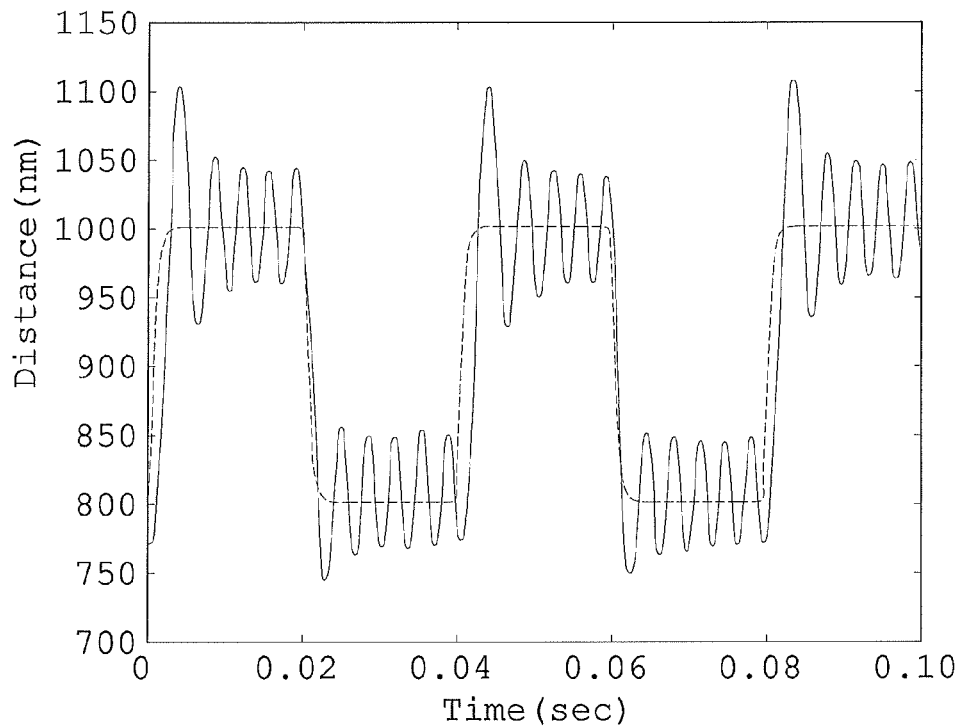
FIG. 5A is a graph showing the response characteristic in the case where a variable spectroscopic element in prior art is controlled.
Figure 5B:
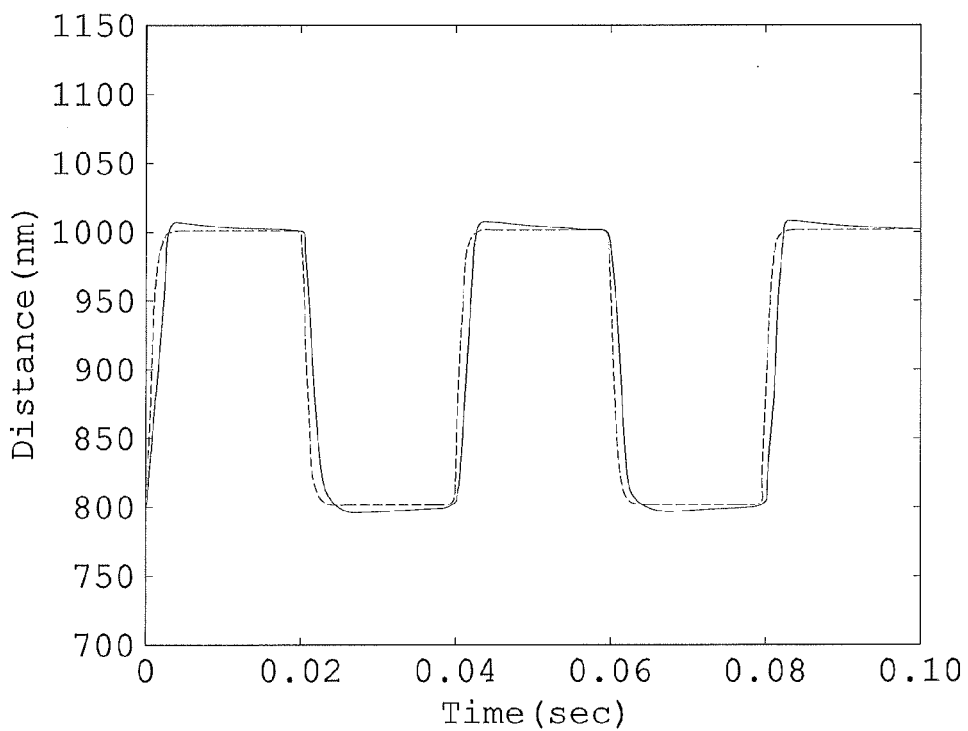
FIG. 5B is a graph showing the response characteristic in the case where the variable spectroscopic element according to the present embodiment is controlled.
Figure 6:
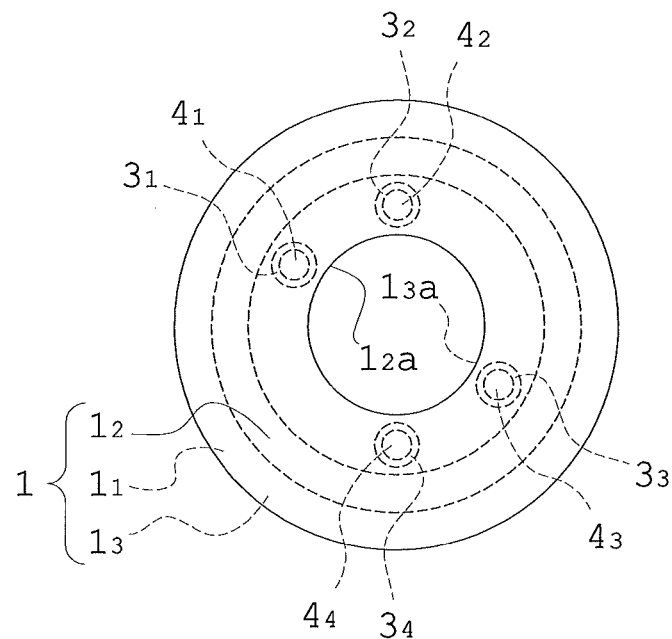
FIG. 6 is a plane view showing the first example of variations of the etalon device shown in FIG. 1.
Figure 7:
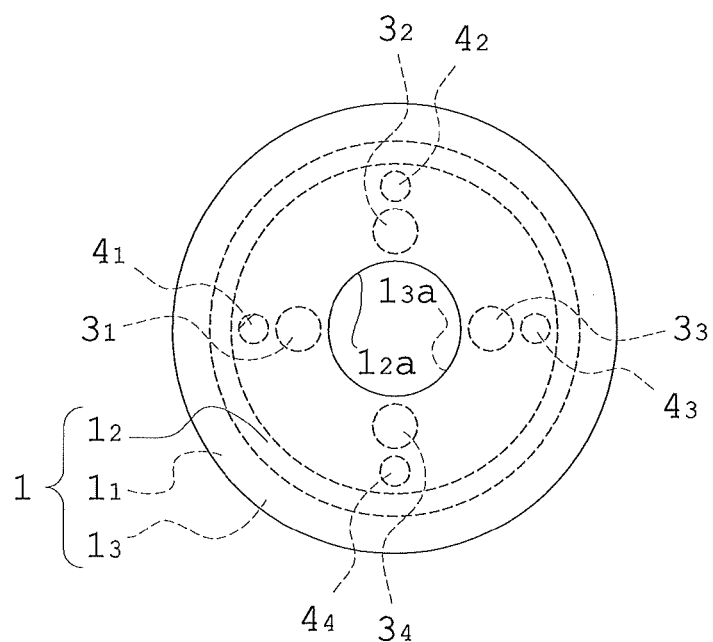
FIG. 7 is a plane view showing the second example of variations of the etalon device shown in FIG. 1.
Figure 8:
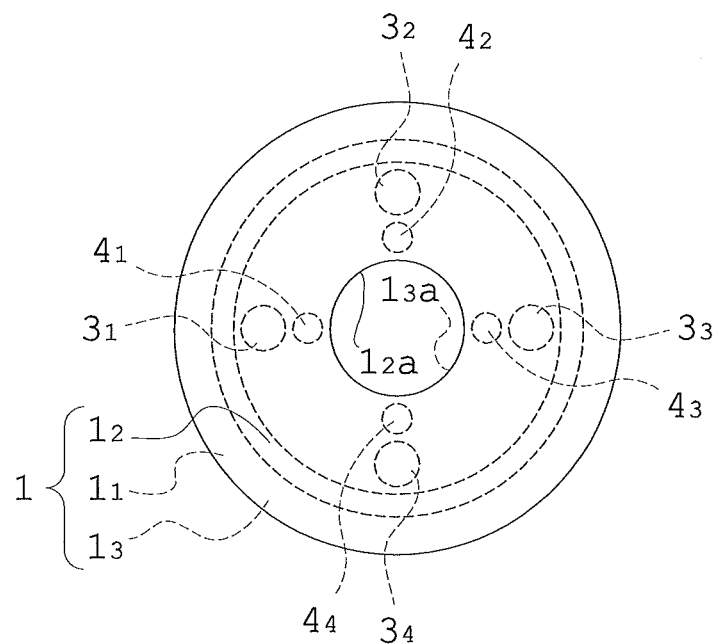
FIG. 8 is a plane view showing the third example of variations of the etalon device shown in FIG. 1.
Figure 9:
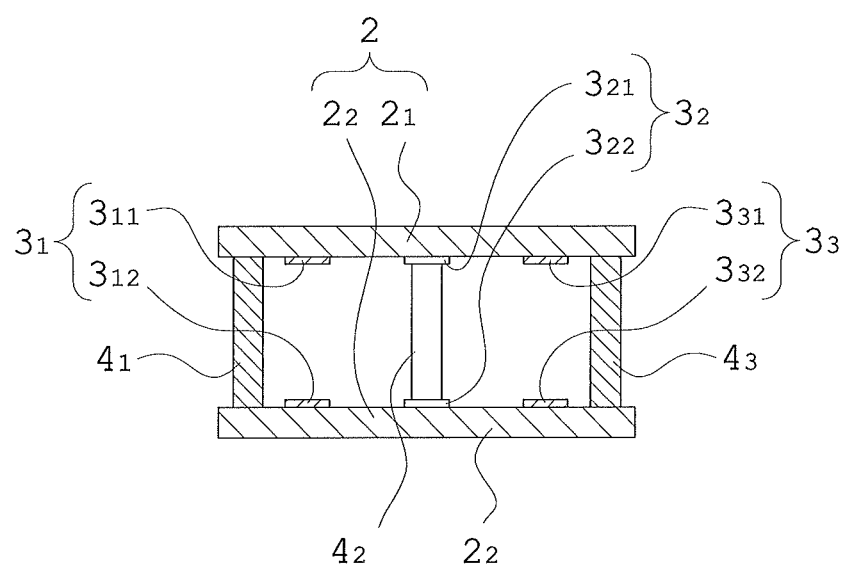
FIG. 9 is a cross sectional view showing the fourth example of variations of the etalon device shown in FIG. 1.

FIG. 1 is a cross sectional view showing an etalon device in a variable spectroscopic element according to the present embodiment. FIG. 2 is a plane view showing the etalon device shown in FIG. 1. FIG. 3 is a schematic view showing operations of a pair of optical substrates and four piezoelectric devices in the etalon device shown in FIG. 1. FIG. 4 is a block diagram showing an operation which is performed by a control unit of the variable spectroscopic element according to the embodiment 1. FIG. 5 is a graph showing the response characteristic of the etalon device shown in FIG. 1, FIG. 5A is a graph showing the response characteristic in the case where a variable spectroscopic element in prior art is controlled, and FIG. 5B is a graph showing the response characteristic in the case where the variable spectroscopic element according to the present embodiment is controlled. FIG. 6 is a plane view showing the first example of variations of the etalon device shown in FIG. 1. FIG. 7 is a plane view showing the second example of variations of the etalon device shown in FIG. 1. FIG. 8 is a plane view showing the third example of variations of the etalon device shown in FIG. 1. FIG. 9 is a cross sectional view showing the fourth example of variations of the etalon device shown in FIG. 1.

The variable spectroscopic element according to the present embodiment includes an etalon device which is shown in FIGS. 1 and 2 and a control unit which is not shown in the drawings.

First, the constitution of the etalon device of this variable spectroscopic element is explained using FIGS. 1 and 2.

As shown in FIGS. 1 and 2, this etalon device includes a pair of optical substrates 2, capacitive sensors for measuring a distance between the surfaces of the pair of the optical substrates 2 opposite to each other, and piezoelectric devices which are actuators for moving one substrate of the pair of the optical substrates 2 and the operation of which is controlled by the control unit not shown in the drawings, the pair of the optical substrates 2, the capacitive sensors, and the piezoelectric devices being placed on the inside of an outer frame 1 of the etalon device.

The outer frame 1 is formed by fitting an annular member $1_2$ to one end surface of a cylindrical member $1_1$ and fitting an annular member $1_3$ to the other end surface of the cylindrical member $1_1$.

Also, circular openings $1_2a$ and $1_3a$ are formed in the approximately middle portions of the annular members $1_2$ and $1_3$, respectively. And, light passes through the openings $1_2a$ and $1_3a$ in this etalon device.

The pair of the optical substrates 2 consists of a fixed substrate $2_1$ and a movable substrate $2_2$ which are arranged while the surfaces of the optical substrates 2 opposite to each other are being separate from each other and are being parallel to each other. In the optical substrates 2, the fixed substrate $2_1$ is a disk-like optical member which is fixed to the annular member $1_2$ of the outer frame 1 on the inside of the outer frame 1 while crossing the axis of light passing through the openings $1_2a$ and $1_3a$. On the other hand, the movable substrate $2_2$ is a disk-like optical member which is held by the piezoelectric devices while crossing light passing through the openings $1_2a$ and $1_3a$.

Such a pair of the optical substrates 2 is formed in such a way that the piezoelectric devices move the movable substrate $2_2$ along the axis of light passing through the openings $1_2a$ and $1_3a$ or along the line connecting the centers of mass of the surfaces of the pair of the optical substrates opposite to each other so that a distance between the surfaces of the optical substrates opposite to each other can be changed.

A first capacitive sensor $3_1$, a second capacitive sensor $3_2$, a third capacitive sensor $3_3$, and a fourth capacitive sensor $3_4$ consist of a pair of electrodes $3_{11}$ and $3_{12}$, a pair of electrodes $3_{21}$ and $3_{22}$, a pair of electrodes $3_{31}$ and $3_{32}$, and a pair of electrodes $3_{41}$ and $3_{42}$, respectively. And, these pairs of the electrodes are arranged at positions on the surfaces of the pair of the optical substrates 2 opposite to each other at which these electrodes do not intercept light passing through the openings $1_2a$ and $1_3a$ of the outer frame 1, respectively while the electrodes of each of the pairs of the electrodes are facing each other.

Besides, these capacitive sensors have characteristics in which electrostatic capacities between their electrodes change in inverse proportion to a distance between the surfaces of the optical substrates. And, in this etalon device, values acquired by these capacitive sensors are transformed into values of distances between the surfaces of the optical substrates 2 to be outputted to the control unit which is not shown in the drawings.

A first piezoelectric device $4_1$, a second piezoelectric device $4_2$, a third piezoelectric device $4_3$, and a fourth piezoelectric device $4_4$ are fixed to the annular member $1_3$ of the outer frame 1 on the inside of the outer frame 1 in such a way that these piezoelectric devices do not intercept light passing through the openings $1_2a$ and $1_3a$.

And, the first, second, third, and fourth capacitive sensors $3_1$, $3_2$, $3_3$, and $3_4$ and the first, second, third, and fourth piezoelectric devices $4_1$, $4_2$, $4_3$, and $4_4$ are arranged at positions at which the first piezoelectric device $4_1$ overlaps with the first capacitive sensor $3_1$, the second piezoelectric device $4_2$ overlaps with the second capacitive sensor $3_2$, the third piezoelectric device $4_3$ overlaps with the third capacitive sensor $3_3$, and the fourth piezoelectric device $4_4$ overlaps with the fourth capacitive sensor $3_4$ when these capacitive sensors and these piezoelectric devices are viewed from the direction along the line connecting the centers of mass of the surfaces of the pair of the optical substrates 2 opposite to each other, respectively.

Also, the first capacitive sensor $3_1$, the third capacitive sensor $3_3$, the first piezoelectric device $4_1$, and the third piezoelectric device $4_3$ are arranged at positions at which the first capacitive sensor $3_1$ and the first piezoelectric device $4_1$ are symmetrical to the third capacitive sensor $3_3$ and the third piezoelectric device $4_3$ with respect to the line connecting the centers of mass of the surfaces of the pair of the optical substrates 2 opposite to each other when the first and third capacitive sensors and the first and third piezoelectric devices are viewed from the direction along the line connecting the centers of mass of the surfaces of the pair of the optical substrates 2, respectively.

On the other hand, the second capacitive sensor $3_2$, the fourth capacitive sensor $3_4$, the second piezoelectric device $4_2$, and the fourth piezoelectric device $4_4$ are arranged at positions at which the second capacitive sensor $3_2$ and the second piezoelectric device $4_2$ are symmetrical to the fourth capacitive sensor $3_4$ and the fourth piezoelectric device $4_4$ with respect to the line connecting the centers of mass of the surfaces of the pair of the optical substrates 2 opposite to each other when the second and fourth capacitive sensors and the second and fourth piezoelectric devices are viewed from the direction along the line connecting the centers of mass of the surfaces of the pair of the optical substrates 2, respectively.

That is to say, the first capacitive sensor $3_1$ and the first piezoelectric device $4_1$, the second capacitive sensor $3_2$ and the second piezoelectric device $4_2$, the third capacitive sensor $3_3$ and the third piezoelectric device $4_3$, and the fourth capacitive sensor $3_4$ and the fourth piezoelectric device $4_4$ are arranged at regular intervals when these capacitive sensors and these piezoelectric devices are viewed from the direction along the line connecting the centers of mass of the surfaces of the pair of the optical substrates 2 opposite to each other.

Next, operation of the movable substrate $2_2$ and control of the movable substrate $2_2$ in the etalon device of the variable spectroscopic element according to the present embodiment are explained using FIG. 3.

As shown in FIG. 3, when the movable substrate $2_2$ is moved relative to the fixed substrate $2_1$ so that a surface distance between the pair of the optical substrates 2 has a value of $x_0$, in order to make a surface distance between the pair of the optical substrates 2 have the target value of $x_0$, etalon devices in the prior art are operated in such a way that: the first piezoelectric device $4_1$ is driven on the basis of an output value of the first capacitive sensor $3_1$ so that the surface distance at the positions at which the first capacitive sensor $3_1$ is placed has the target value of $x_0$; and, similarly, the second piezoelectric device $4_2$ is driven on the basis of an output value of the second capacitive sensor $3_2$, the third piezoelectric device $4_3$ is driven on the basis of an output value of the third capacitive sensor $3_3$, and the fourth piezoelectric device $4_4$ is driven on the basis of an output value of the fourth capacitive sensor $3_4$.

However, in such control, for example, even though the first piezoelectric device $4_1$ is accurately driven and a distance between the surfaces of the pair of the optical substrates 2 at the position at which the first capacitive sensor $3_1$ is placed has the target value of $x_0$, interference causing in driving the second and fourth piezoelectric devices $4_2$ and $4_4$ that are adjacent to the first piezoelectric device $4_1$ afterward may inevitably make the surface distance change from the target value of $x_0$.

There is a way of using feedback control such as PID control (Proportional Integral Derivative Control) as a way of solving it. However, in this case, it takes a long time to make the surface distance between the optical substrates reach the target value of $x_0$.

Also, another ways of solving it include a way of giving each of the piezoelectric devices a value which is calculated in advance against the interference from another piezoelectric device as a command value. However, a calculation of that command value is very complicated, so that it takes a long time to make the surface distance between the pair of the optical substrates 2 reach the target value of $x_0$, similarly.

Accordingly, in the variable spectroscopic element according to the present embodiment, four output values from the first to fourth capacitive sensors $3_1$, $3_2$, $3_3$, and $3_4$ are transformed into three parameters and operations are performed. In such a manner, drive control of the first to fourth piezoelectric devices $4_1$, $4_2$, $4_3$, and $4_4$ is performed.

Now, operations which are carried out by the control unit of the variable spectroscopic element according to the present embodiment is explained in detail using FIGS. 3 to 5.

When the movable substrate $2_2$ is moved relative to the fixed substrate $2_1$ so that a surface distance between the pair of the optical substrates 2 has a value of $x_0$ as shown in FIG. 3 in the variable spectroscopic member according to the present embodiment, the target value $x_0$ of a distance between the center of mass $G_1$ of the surface of the fixed substrate $2_1$ and the center of mass $G_2$ of the surface of the movable substrate $2_2$, these surfaces being opposite to each other, a target value $\theta_0$ of a first angle made between the surface perpendicular to the line connecting the centers of mass $G_1$ and $G_2$ and the surface of the movable substrate $2_2$ opposite to the surface perpendicular to the line, and a target value $\phi_0$ of a second angle made between the surface perpendicular to the line connecting the centers of mass $G_1$ and $G_2$ and the surface of the movable substrate $2_2$ opposite to the surface perpendicular to the line are first inputted into the control unit through a target value input part $5_1$, as shown in FIG. 4.

Next, a sensor output transformation part $5_2$ acquires surface distances $x_1$, $x_2$, $x_3$, and $x_4$ between the optical substrates at the positions at which the first, second, third, and fourth capacitive sensors $3_1$, $3_2$, $3_3$, and $3_4$ are placed respectively, the surface distances $x_1$, $x_2$, $x_3$, and $x_4$ at the respective positions being measured by these capacitive sensors $3_1$, $3_2$, $3_3$, and $3_4$ respectively. And then, the sensor output transformation part $5_2$ transforms the surface distances $x_1$, $x_2$, $x_3$, and $x_4$ into the present value x of a distance between the centers of mass $G_1$ and $G_2$, the present value $\theta$ of the first angle, and the present value $\phi$ of the second angle.

Specifically, the distance x between the centers of mass of the surfaces of the pair of the optical substrates 2 opposite to each other is found by the following formula:

$$x=(x_1+x_2+x_3+x_4)/4.$$

Also, the first and second angles $\theta$ and $\phi$ which are made between the surface perpendicular to the line connecting the centers of mass of the surfaces of the pair of the optical substrates 2 and the surface of the movable substrate $2_2$ opposite to the fixed substrate $2_1$ are expressed by the following formulas with the known distances $r_{31}$, $r_{32}$, $r_{33}$, and $r_{34}$ from the center of mass $G_2$ of the surface of the movable substrate $2_2$ to the centers of the electrodes $3_{12}$, $3_{22}$, $3_{32}$, and $3_{42}$ of the first to fourth capacitive sensors $3_1$, $3_2$, $3_3$, and $3_4$ respectively on the surface of the movable substrate $2_2$:

$$\sin\theta=(x_3-x_1)/(r_{31}+r_{33})$$

$$\sin\phi=(x_4-x_2)/(r_{32}+r_{34}).$$

Besides, in the present embodiment, $$r_{31}=r_{32}=r_{33}=r_{34}=r,$$

and, both of the first angle $\theta$ and the second angle $\phi$ are sufficiently small, so that the first angle $\theta$ and the second angle $\phi$ are found by the following formulas:

$$\theta=(x_3-x_1)/2r$$

$$\phi=(x_4-x_2)/2r.$$

Next, a difference value calculating part $5_3$ calculates a value ex of a difference between the target value $x_0$ inputted through the target value input part $5_1$ and the value x transformed by the sensor output transformation part $5_2$, a value e$\theta$ of a difference between the target value $\theta_0$ inputted through the target value input part $5_1$ and the value $\theta$ transformed by the sensor output transformation part $5_2$, and a value e$\phi$ of a difference between the target value $\phi_0$ inputted through the target value input part $5_1$ and the value $\phi$ transformed by the sensor output transformation part $5_2$.

Next, a command value calculating part $5_4$ carries out PID control on the basis of the difference values ex, e$\theta$, and e$\phi$ that are calculated by the difference value calculating part $5_3$, and the command value calculating part $5_4$ finds command values $x_c$, $\theta_c$, and $\phi_c$.

Next, a command value transformation part $5_5$ transforms the command values $x_c$, $\theta_c$, and $\phi_c$ that are found by the command value calculating part $5_4$, into command values $x_{c1}$, $\theta_c$, $x_{c2}$, $x_{c3}$, and $x_{c4}$ for the first to fourth piezoelectric devices $4_1$, $4_2$, $4_3$, and $4_4$ respectively. The command values $x_{c1}$, $x_{c2}$, $x_{c3}$, and $x_{c4}$ for the first to fourth piezoelectric devices $4_1$, $4_2$, $4_3$, and $4_4$ respectively are inputted into a piezoelectric device-driving driver which drives the first, second, third, and fourth piezoelectric devices $4_1$, $4_2$, $4_3$, and $4_4$ and which is not shown in the drawings, and a drive voltage is applied to each of the first to fourth piezoelectric devices $4_1$, $4_2$, $4_3$, and $4_4$ by this piezoelectric device-driving driver.

Besides, the command values $x_{c1}$, $x_{c2}$, $x_{c3}$, and $x_{c4}$ for the first to fourth piezoelectric devices $4_1$, $4_2$, $4_3$, and $4_4$ respectively are expressed by the following formulas with the known distances $r_{41}$, $r_{42}$, $r_{43}$, and $r_{44}$ to the centers of the first to fourth piezoelectric devices $4_1$, $4_2$, $4_3$, and $4_4$ respectively on the surface of the movable substrate $2_2$:

$$x_{c1}=x_c-r_{41}\sin\theta_c$$

$$x_{c2}=x_c-r_{42}\sin\phi_c$$

$$x_{c3}=x_c+r_{43}\sin\theta_c$$

$$x_{c4}=x_c+r_{44}\sin\phi_c.$$

Also, in the present embodiment, $$r_{41}=r_{42}=r_{43}=r_{44}=r,$$

and, both of the command value $\theta_c$ for the first angle and the command value $\phi_c$ for the second angle are sufficiently small, so that the command values $x_{c1}$, $x_{c2}$, $x_{c3}$, and $x_{c4}$ for the first to fourth piezoelectric devices $4_1$, $4_2$, $4_3$, and $4_4$ respectively are expressed by the following formulas:

$$x_{c1}=x_c-r\theta_c$$

$$x_{c2}=x_c-r\phi_c$$

$$x_{c3}=x_c+r\theta_c$$

$$x_{c4}=x_c+r\phi_c.$$

Afterward, the first to fourth piezoelectric devices $4_1$, $4_2$, $4_3$, and $4_4$ are driven by the voltages that are applied by the piezoelectric device-driving driver on the basis of the command values $x_{c1}$, $x_{c2}$, $x_{c3}$, and $x_{c4}$ respectively, so that the movable substrate $2_2$ is moved and the surface distance x between the pair of the optical substrates 2 is changed.

FIG. 5 is a graph showing experimental results on the response characteristics of etalon devices when feedback control is performed in each of variable spectroscopic elements. Besides, a surface distance between the pair of the optical substrates (nm) is plotted on the vertical axis and time (sec) is plotted on the horizontal axis, and FIG. 5A shows an experimental result in a variable spectroscopic element in the prior art, and FIG. 5B shows an experimental result in the variable spectroscopic element of the present embodiment. Besides, in this experiment, as shown with broken lines, signals are inputted while the target value is being changed every 0.02 seconds.

As seen also from FIG. 5, the surface distance between the pair of the optical substrates of the variable spectroscopic element of the present embodiment converges to the target value for considerably shorter time than that of the variable spectroscopic element in the prior art does. As a result, variable spectroscopic elements of the present invention can change their optical characteristics accurately even though the optical characteristics are changed continuously and at high speed.

Next, examples of variations of the etalon device of the variable spectroscopic element of the present embodiment are shown using FIGS. 6 to 9.

An etalon device shown in FIG. 6 is different from the etalon device of the variable spectroscopic element of the above-described embodiment. In the etalon device shown in FIG. 6, the first capacitive sensor $3_1$ and the first piezoelectric device $4_1$, the second capacitive sensor $3_2$ and the second piezoelectric device $4_2$, the third capacitive sensor $3_3$ and the third piezoelectric device $4_3$, and the fourth capacitive sensor $3_4$ and the fourth piezoelectric device $4_4$ are not arranged at regular intervals when these capacitive sensors and these piezoelectric devices are viewed from the direction along the line connecting the centers of mass of the surfaces of the pair of the optical substrates 2 opposite to each other.

However, if: the first capacitive sensor $3_1$ and the first piezoelectric device $4_1$ and the third capacitive sensor $3_3$ and the third piezoelectric device $4_3$ are arranged symmetrically with respect to the line connecting the centers of mass of the surfaces of the pair of the optical substrates 2 opposite to each other when these capacitive sensors and these piezoelectric devices are viewed from the direction along the line connecting the centers of mass of the surfaces of the optical substrates; and the second capacitive sensor $3_2$ and the second piezoelectric device $4_2$ and the fourth capacitive sensor $3_4$ and the fourth piezoelectric device $4_4$ are arranged symmetrically with respect to the line connecting the centers of mass of the surfaces of the pair of the optical substrates 2 opposite to each other when these capacitive sensors and these piezoelectric devices are viewed from the direction along the line connecting the centers of mass of the surfaces of the optical substrates, the control unit can control the etalon device shown in FIG. 6 by performing the same operation as is performed in the etalon device of the variable spectroscopic element of the above-described embodiment, even though these capacitive sensors and these piezoelectric devices are arranged as shown in FIG. 6.

Etalon devices shown in FIGS. 7 and 8 are different from the etalon device of the variable spectroscopic element of the above-described embodiment. In the etalon devices shown in FIGS. 7 and 8, the first capacitive sensor $3_1$ and the first piezoelectric device $4_1$, the second capacitive sensor $3_2$ and the second piezoelectric device $4_2$, the third capacitive sensor $3_3$ and the third piezoelectric device $4_3$, and the fourth capacitive sensor $3_4$ and the fourth piezoelectric device $4_4$ are arranged while the first capacitive sensor $3_1$ and the first piezoelectric device $4_1$, the second capacitive sensor $3_2$ and the second piezoelectric device $4_2$, the third capacitive sensor $3_3$ and the third piezoelectric device $4_3$, and the fourth capacitive sensor $3_4$ and the fourth piezoelectric device $4_4$ are not overlapping with each other respectively, when these capacitive sensors and these piezoelectric devices are viewed from the direction along the line connecting the centers of mass of the surfaces of the pair of the optical substrates 2 opposite to each other.

However, if the first piezoelectric device $4_1$, the second piezoelectric device $4_2$, the third piezoelectric device $4_3$, and the fourth piezoelectric device $4_4$ are arranged on the lines running to the centers of the first capacitive sensor $3_1$, the second capacitive sensor $3_2$, the third capacitive sensor $3_3$, and the fourth capacitive sensor $3_4$ respectively when these capacitive sensors and these piezoelectric devices are viewed from the direction along the line connecting the centers of mass of the surfaces of the pair of the optical substrates 2 opposite to each other, the control units can control the etalon devices shown in FIGS. 7 and 8 by performing the same operation as is performed in the etalon device of the variable spectroscopic element of the above-described embodiment, even though these capacitive sensors and these piezoelectric devices are arranged as shown in FIG. 7 or 8.

An etalon device shown in FIG. 9 is different from the etalon device of the variable spectroscopic element of the above-described embodiment. The etalon device shown in FIG. 9 does not include the outer frame 1, and the first piezoelectric device $4_1$, the second piezoelectric device $4_2$, the third piezoelectric device $4_3$, and the fourth piezoelectric device $4_4$ are fixed on the surface of the fixed substrate $2_1$ opposite to the other surface in such a way that the first piezoelectric device $4_1$, the second piezoelectric device $4_2$, the third piezoelectric device $4_3$, and the fourth piezoelectric device $4_4$ do not intercept light passing through the etalon device.

However, the control unit can control the etalon device shown in FIG. 9 by performing the same operation as is performed in the etalon device of the variable spectroscopic element of the above-described embodiment, even though these capacitive sensors and these piezoelectric devices are arranged as shown in FIG. 9.

Embodiment 2

Figure 10:
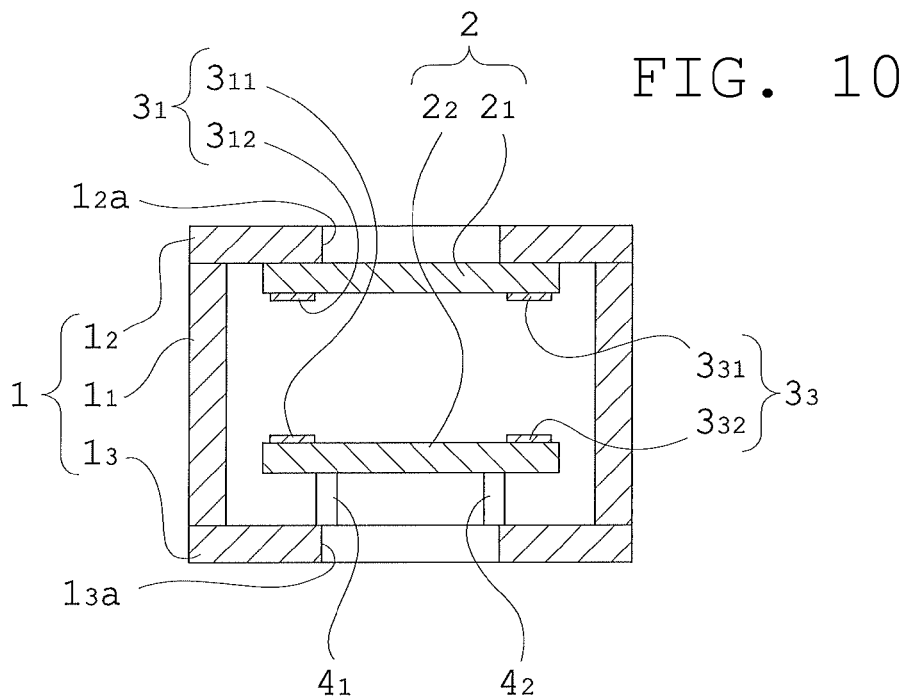
FIG. 10 is a cross sectional view showing an etalon device in a variable spectroscopic element according to the embodiment 2.
Figure 11:
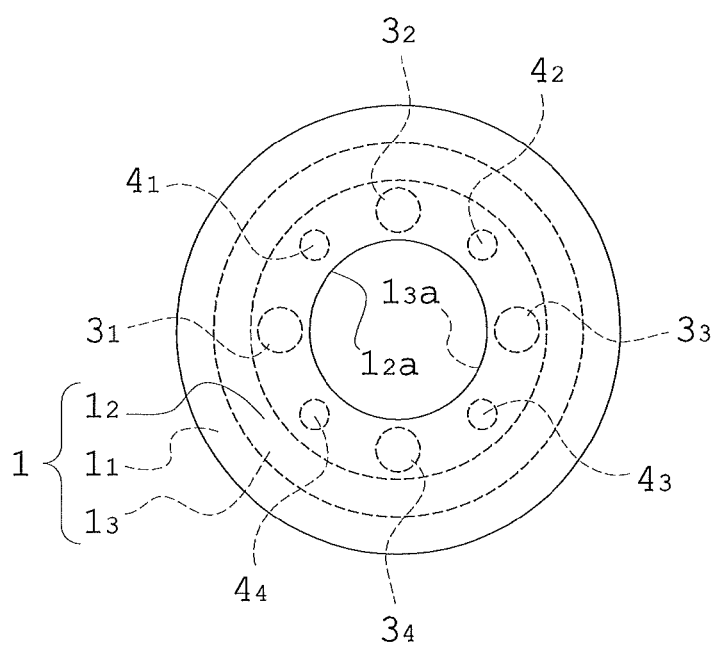
FIG. 11 is a plane view showing the etalon device shown in FIG. 10.

A variable spectroscopic element of the embodiment 2 which is provided with an etalon device of a variable spectroscopic element according to the present invention is explained using FIGS. 10 and 11. Besides, components constituting the etalon device of the variable spectroscopic element of the present embodiment are the same as those constituting the etalon device of the embodiment 1 respectively. Accordingly, components having the same constitution are given the same reference numeral as in the embodiment 1, and detailed explanations of these components are omitted. Also, a constitution of a control unit of the variable spectroscopic element of the present embodiment and operation performed in the control unit for the present embodiment are approximately the same as those for the control unit of the variable spectroscopic element of the embodiment 1. Accordingly, detailed explanations of these matters are omitted.

Besides, FIG. 10 is a cross sectional view showing an etalon device in a variable spectroscopic element according to the present embodiment. FIG. 11 is a plane view showing the etalon device shown in FIG. 10.

The constitution of the etalon device in this variable electroscopic element is explained using FIGS. 10 and 11.

An etalon device of the variable spectroscopic element according to the present embodiment is different from the etalon device of the variable spectroscopic element of the embodiment 1. In the etalon device for the present embodiment, the first to fourth piezoelectric devices $4_1$, $4_2$, $4_3$, and $4_4$ and the first to fourth capacitive sensors $3_1$, $3_2$, $3_3$, and $3_4$ are arranged at regular intervals on a circle while the piezoelectric devices are alternating with the capacitive sensors, when these capacitive sensors and these piezoelectric devices are viewed from the direction along the line connecting the centers of mass of the surfaces of the pair of the optical substrates 2 opposite to each other.

Next, operation of the movable substrate $2_2$ and control of the movable substrate $2_2$ in the etalon device of the variable spectroscopic element according to the present embodiment are explained.

In the variable spectroscopic element of the embodiment 1, a distance x between the centers of mass of the surfaces of the pair of the optical substrates 2 opposite to each other is calculated with output values from the first to fourth capacitive sensors $3_1$, $3_2$, $3_3$, and $3_4$, a first angle θ is calculated with output values from the first and third capacitive sensors $3_1$ and $3_3$, and a second angle φ is calculated with output values from the second and fourth capacitive sensors $3_2$ and $3_4$. And, operations of the first and third piezoelectric devices $4_1$ and $4_3$ are controlled on the basis of the distance x between the centers of mass of the surfaces and the first angle θ, and operations of the second and fourth piezoelectric devices $4_2$ and $4_4$ are controlled on the basis of the distance x between the centers of mass of the surfaces and the second angle φ.

On the other hand, in the variable spectroscopic element of the present embodiment, a distance x between the centers of mass of the surfaces of the pair of the optical substrates 2 opposite to each other, a first angle θ, and a second angle φ are calculated with all of output values from the first to fourth capacitive sensors $3_1$, $3_2$, $3_3$, and $3_4$. And, operations of the first to fourth piezoelectric devices $4_1$, $4_2$, $4_3$, and $4_4$ are controlled on the basis of the distance x between the centers of mass of the surfaces, the first angle θ, and the second angle φ.

As described above, in the present embodiment, even though the capacitive sensors 3 and the piezoelectric devices 4 are not arranged at positions at which the capacitive sensors 3 are overlapping with the piezoelectric devices 4 respectively when these capacitive sensors and these piezoelectric devices are viewed from the direction along the line connecting the centers of mass of the surfaces of the pair of the optical substrates 2 opposite to each other, a distance between the surfaces of the pair of the optical substrates 2 opposite to each other, which is detected by the capacitive sensors 3, is transformed into surface distances $x_1$, $x_2$, $x_3$, and $x_4$ between the optical substrates at positions at which the first to fourth piezoelectric devices $4_1$, $4_2$, $4_3$, and $4_4$ are placed respectively. As a result, it is possible to perform the same control as is performed in the embodiment 1.

Accordingly, also in the present embodiment 2, the surface distance between the pair of the optical substrates 2 of the variable spectroscopic element of the present embodiment converges to the target value for considerably shorter time than that of the variable spectroscopic element in the prior art does, as well as the variable spectroscopic element of the embodiment 1. As a result, variable spectroscopic elements of the present invention can change their optical characteristics accurately even though their optical characteristics are changed continuously and at high speed.

Variable spectroscopic elements according to the present invention can be favorably used for spectroscopic endoscopes and so on because the variable spectroscopic endoscopes can change their optical characteristics at high speed and accurately. As a result, the variable spectroscopic elements according to the present invention are extremely practically useful.

What is claimed is:

1. A variable spectroscopic element characterized in that the variable spectroscopic element comprises a pair of optical substrates which are arranged opposite at a distance from each other, first, second, third, and fourth capacitive sensors each of which includes a pair of electrodes placed on the surfaces of the pair of the optical substrates opposite to each other respectively and each of which detects a distance between the surfaces of the pair of the optical substrates opposite to each other at the each placed position, and first, second, third, and fourth actuators which move at least one of the pair of the optical substrates relative to the other optical substrate to change a distance between the surfaces of the pair of the optical substrates opposite to each other, the first and third capacitive sensors are placed at positions at which the first and third capacitive sensors are symmetrical with respect to a line connecting the centers of mass of the surfaces of the pair of the optical substrates opposite to each other, respectively, the second and fourth capacitive sensors are placed at positions at which the second and fourth capacitive sensors are symmetrical with respect to the line connecting the centers of mass of the surfaces of the pair of the optical substrates opposite to each other, respectively, the first, second, third, and fourth actuators are placed on lines running from the centers of mass of the surfaces of the pair of the optical substrates opposite to each other to the centers of the first, second, third, and fourth capacitive sensors respectively, respectively, and the variable spectroscopic element comprises a control unit, the control unit calculating a distance between the centers of mass of the surfaces of the pair of the optical substrates opposite to each other with signals from the first, second, third, and fourth capacitive sensors, the control unit calculating with signals from the first and third capacitive sensors a first angle that is made between the surface of the optical substrate perpendicular to the line connecting the centers of mass of the surfaces of the pair of the optical substrates and the surface of the moved optical substrate opposite to the surface of the optical substrate perpendicular to the line connecting the centers of mass of the surfaces of the pair of the optical substrates, the control unit calculating with signals from the second and fourth capacitive sensors a second angle that is made between the surface of the optical substrate perpendicular to the line connecting the centers of mass of the surfaces of the pair of the optical substrates and the surface of the moved optical substrate opposite to the surface of the optical substrate perpendicular to the line connecting the centers of mass of the surfaces of the pair of the optical substrates, the control unit driving the first and third actuators on the basis of the distance between the centers of mass and the first angle, and the control unit driving the second and fourth actuators on the basis of the distance between the centers of mass and the second angle.

2. A variable spectroscopic element according to claim 1, characterized in that the first, second, third, and fourth capacitive sensors and the first, second, third, and fourth actuators are placed at positions at which the first, second, third, and fourth capacitive sensors overlap with the first, second, third, and fourth actuators respectively when these capacitive sensors and these actuators are viewed from a direction along the line connecting the centers of mass of the surfaces of the pair of the optical substrates opposite to each other, respectively, and the following conditions are satisfied:

$$x_1 = x - r \sin \theta$$

$$x_2 = x - r \sin \phi$$

$$x_3 = x + r \sin \theta$$

$$x_4 = x + r \sin \phi$$

where x denotes a distance between the centers of mass of the surfaces of the pair of the optical substrates, $x_1$, $x_2$, $x_3$, and $x_4$ denote distances between the surfaces of the pair of the optical substrates at the positions at which the first, second, third, and fourth capacitive sensors are placed respectively, respectively, θ denotes the first angle, φ denotes the second angle, and r denotes a distance between the center of mass of the surface of the movable substrate and each of the capacitive sensors on the surface of the movable substrate.

3. A variable spectroscopic element according to claim 1, characterized in that the control unit calculates a distance between the centers of mass of the surfaces of the optical substrates by taking the average of distances between the surfaces of the pair of the optical substrates opposite to each other at the positions at which the first, second, third, and fourth capacitive sensors are placed respectively, the control unit calculates the first angle with a difference between distances between the surfaces of the pair of the optical substrates opposite to each other at the positions at which the first and third capacitive sensors are placed respectively, and the control unit calculates the second angle with a difference between distances between the surfaces of the pair of the optical substrates opposite to each other at the positions at which the second and fourth capacitive sensors are placed respectively.

4. A variable spectroscopic element according to claim 1, characterized in that the first, second, third, and fourth capacitive sensors and the first, second, third, and fourth actuators are placed at positions at which the first, second, third, and fourth capacitive sensors overlap with the first, second, third, and fourth actuators respectively when these capacitive sensors and these actuators are viewed from a direction along the line connecting the centers of mass of the surfaces of the pair of the optical substrates opposite to each other, respectively, and the following conditions are satisfied:

$$x=(x_1+x_2+x_3+x_4)/4$$

$$\theta=R_1(x_3-x_1)$$

$$\phi=R_2(x_4-x_2)$$

where x denotes a distance between the centers of mass of the surfaces of pair of the optical substrates, $x_1$, $x_2$, $x_3$, and $x_4$ denote distances between the surfaces of the pair of the optical substrates opposite to each other at the positions at which the first, second, third, and fourth capacitive sensors are placed respectively, respectively, $\theta$ denotes the first angle, $\phi$ denotes the second angle, and $R_1$ and $R_2$ denote predetermined coefficients.

5. A variable spectroscopic element characterized in that the variable spectroscopic element comprises a pair of optical substrates which are arranged opposite at a distance from each other, first, second, third, and fourth capacitive sensors each of which includes a pair of electrodes placed on the surfaces of the pair of the optical substrates opposite to each other respectively and each of which detects a distance between the surfaces of the pair of the optical substrates opposite to each other at the each placed position, and first, second, third, and fourth actuators which move at least one of the pair of the optical substrates relative to the other optical substrate to change a distance between the surfaces of the pair of the optical substrates opposite to each other, the first and third capacitive sensors are placed at positions at which the first and third capacitive sensors are symmetrical with respect to a line connecting the centers of mass of the surfaces of the pair of the optical substrates opposite to each other, respectively, the second and fourth capacitive sensors are placed at positions at which the second and fourth capacitive sensors are symmetrical with respect to the line connecting the centers of mass of the surfaces of the pair of the optical substrates opposite to each other, respectively, the first, second, third, and fourth capacitive sensors and the first, second, third, and fourth actuators are arranged on a circle at regular intervals one after the other when these capacitive sensors and these actuators are viewed from a direction along the line connecting the centers of mass of the surfaces of the pair of the optical substrates opposite to each other, and the variable spectroscopic element comprises a control unit, the control unit calculating a distance between the centers of mass of the surfaces of the pair of the optical substrates opposite to each other with signals from the first, second, third, and fourth capacitive sensors, the control unit calculating a first angle that is made between the surface of the optical substrate perpendicular to the line connecting the centers of mass of the surfaces of the pair of the optical substrates and the surface of the moved optical substrate opposite to the surface of the optical substrate perpendicular to the line connecting the centers of mass of the surfaces of the pair of the optical substrates, with values of distances between the surfaces of the pair of the optical substrates opposite to each other at the positions at which the first and third actuators are placed respectively, these values of the distances between the surfaces of the optical substrates at the positions of the first and third actuators being found with signals from the first, second, third, and fourth capacitive sensors, the control unit calculating a second angle that is made between the surface of the optical substrate perpendicular to the line connecting the centers of mass of the surfaces of the pair of the optical substrates and the surface of the moved optical substrate opposite to the surface of the optical substrate perpendicular to the line connecting the centers of mass of the surfaces of the pair of the optical substrates, with values of distances between the surfaces of the pair of the optical substrates opposite to each other at the positions at which the second and fourth actuators are placed respectively, these values of the distances between the surfaces of the optical substrates at the positions of the second and fourth actuators being found with signals from the first, second, third, and fourth capacitive sensors, and the control unit driving the first, second, third, and fourth actuators on the basis of the distance between the centers of mass, the first angle, and the second angle.

\* \* \* \* \*